Patented Apr. 20, 1948

2,440,036

UNITED STATES PATENT OFFICE 2,440,036

PROCESS FOR THE CATALYTIC ALKYLATION OF PHENOLS BY AMINES

De Loss E. Winkler, Berkeley, and Seaver A. Ballard, Oakland, Calif., assignors to Shell Development Company, San Francisco, Calif., a corporation of Delaware No Drawing. Application April 26, 1944,
Serial No. 532,887

15 Claims. (Cl. 260—624)

This invention relates to a process for the introduction of hydrocarbon radicals into the aromatic nucleus of phenolic compounds.

The process of the invention comprises reacting a phenolic compound with an amine in the presence of a catalyst to produce a phenolic compound containing one or more hydrocarbon radicals substituted into the aromatic nucleus. For example, by this process, phenol may be converted to cresols, xylenols, trimethyl-, tetramethyl- or pentamethyl phenols; cresols and xylenols may be converted to trimethyl-, tetramethyl- or pentamethyl phenols; resorcinols may be reacted to produce monoethyl-, diethyl-, triethyl- or tetraethyl resorcinols; and pyrogallol may be converted to monobutyl-, dibutyl- or tributyl pyrogallol.

Suitable phenolic compounds which may be employed as starting reactants in the execution of the process of the invention include the monohydric and polyhydric phenolic compounds as well as the thiophenolic compounds wherein one or more positions in the aromatic nucleus are open for the introduction of a hydrocarbon radical. Representative phenolic compounds which may be reacted according to the process of this invention are phenol, the cresols, the xylenols, thymol, naphthol, o-phenylphenol, p-phenylphenol, resorcinol, guaiacol, pseudocumenol, carvacrol, pyrocatechol, quinol, orcinol, phloroglucinol, pyrogallol, hydroxyquinol, anthranol, phenanthrol, hydroxyquinoline, flavol and the like and their homologues. It is to be understood that a mixture of any of the above compounds may be used in the execution of the process of this invention. For example, it has been found convenient to use a mixture of phenol and cresols such as is found in the commercial products known as petroleum cresylic acids. Since it has been found that the meta positions in phenol are the most difficult to substitute, it is convenient to use 3,5-xylenol as a starting reactant when highly methylated phenols are desired. 3,5-xylenol may be used to prepare 2,3,5-trimethyl phenol, a valuable intermediate product in the production of vitamins, 2,3,5,6-tetramethyl phenol, a valuable intermediate in the preparation of organic compounds, which up to the present time has been a very expensive compound due to the complicated known methods of preparation, and also pentamethyl phenol a valuable inhibitor for addition to gasoline.

The compound which may be employed as the source of the hydrocarbon radicals to be introduced into the phenolic compound may be a primary, secondary or tertiary amine which may contain aliphatic, aromatic and/or alicyclic hydrocarbon radicals attached to the nitrogen atom. It has been found convenient to use primary saturated aliphatic amines such as methyl amine, ethyl amine, propyl amine, isopropyl amine, butyl amine, isobutyl amine, tertiary butyl amine, amyl amine, isoamyl amine, hexyl amine, and the like and their homologues. Representative of other amines which may be reacted according to the process of the invention are the aryl amines such as aniline, monomethyl aniline, dimethyl aniline, diethyl aniline, benzyl aniline, diphenyl amine, triphenyl amine, naphthyl amine, etc.; cycloaliphatic amines such as cyclobutyl amine, cyclopropylcarbinyl amine, cyclohexyl amine, isophoryl amine, etc.; unsaturated amines such as vinyl amine, allyl amine, crotyl amine, cinnamyl amine, cyclohexenyl amine, etc.; secondary and tertiary amines such as dimethyl amine, trimethyl amine, ethyl dimethyl amine, ethyl isobutyl amine, ethyl tertiary butyl amine, dimethyl gamma-butenyl amine, etc.; and the like and their homologues.

The reaction of the amine with a phenolic compound to produce the corresponding substituted phenolic compound may take place in the presence or absence of a catalyst, although it is preferred to execute the process of the invention in the presence of a catalyst, for example, a condensation catalyst such as activated bleaching earths, metal salts, e. g. ferric chloride, aluminum chloride, aluminum sulfate, etc. The condensation catalysts which may be used in the execution of the process of the invention are preferably selected from the group comprising the metal oxides such as aluminum oxide, thorium oxide, zirconium oxide, zinc oxide, iron oxide, chromium oxide, manganese oxide, magnesium oxide, calcium oxide, barium oxide, etc. The catalyst may be a solid substance which has an active surface due to its chemical nature and/or to its degree of subdivision or amount of available reaction surface. The catalyst may be in the form of a fine powder, in the form of pellets or other formed pieces of suitable size, or it may be in the form of fragments of suitable size. Single catalysts or mixtures of different catalysts may be employed, and they may be used with or without promoters and/or active or inert supports such as pumice, silica gel, activated charcoal, kieselguhr, etc. It has been found that a catalyst containing a substantial amount of aluminum oxide is suitable for the above defined treatment of phenolic compounds with an amine to produce the corresponding substituted phenolic compounds. Especially suitable is a catalyst consisting of or comprising an activated alumina, i. e. an adsorptive alumina, which consists predominantly of alumina alpha monohydrate and/or gamma alumina, and which may or may not be impregnated with or contain some other suitable substance, e. g. activated alumina impregnated with lesser amounts of ferric oxide. Alumina catalysts which are characterized by their highly active adsorptive properties may be obtained from natural sources or they may be prepared by synthetic means. An efficient catalyst may be prepared by treatment of natural bauxite ore. It is generally known that bauxites have different physical and chemical characteristics, depending upon the locale from which they are obtained and upon the subsequent treatment accorded them. For example, the calcination temperature has a decided effect on the surface area and the adsorptive capacity of the resultant catalyst; the iron which is present may be capable of removal by magnetic methods, so the iron content may vary within wide limits, depending on the specific treatment; and the water content of a bauxite varies according to the degree of calcination employed. Granular activated bauxites are particularly efficient and in fact comprise one of the preferred catalysts to be employed in the present process, not only because they result in highly improved yields, but also because of the considerably lower cost of such bauxites. Granular activated bauxite possesses a long catalyst life as well as the ability to bring about excellent conversions to the alkylated phenolic products. These activated bauxites, as well as the adsorptive aluminas having the same general physical and chemical characteristics, are particularly suitable as catalysts for the reaction of an amine with a phenolic compound to produce the corresponding substituted phenolic compound.

Another suitable catalyst is an activated or adsorptive alumina which may be prepared by synthetic means. These synthetic aluminas may be prepared from gels which may be peptized or unpeptized, but they are preferably prepared from the crystalline form such as the crystalline alpha alumina trihydrate crystallized from alkali aluminate solutions. A variety of suitable means for activating alumina are in existence, such as the ones described in U. S. Patents 1,868,869 and 2,015,593. The process of U. S. Patent 1,868,869 comprises subjecting to calcination, at a temperature of from 300° C. to 800° C., the deposit which forms in the precipitation tanks and discharge pipes used in the execution of the Fickes-Sherwin modification of the Bayer process. Other suitable methods of preparing and activating the alumina catalyst will be apparent to those skilled in the art.

As has been stated above, if desired, a catalyst may be used comprising an activated alumina and some other suitable metal or metal compound such as the metal oxides mentioned above which may or may not be in chemical combination with the activated alumina on the surface thereof. Some of these catalysts may be prepared by direct impregnation of the activated alumina with a solution of the compound which it is desired to incorporate in the surface thereof, while others can only be prepared indirectly, for example, by impregnation with one compound followed by a conversion treatment whereby said compound is converted to the desired compound. Particularly suitable compound catalysts are those comprising an activated alumina and one or more iron oxides.

The process may be carried out in any suitable apparatus, and may be executed in a batchwise, intermittent or continuous manner. The reaction may be allowed to take place for any suitable length of time. Satisfactory results have been obtained with a duration of about four to about seven hours. However, runs of shorter or longer duration, even greater than about 12 hours, may be used, although longer runs may require the interruption of the process to introduce a charge of fresh catalyst or for regeneration of the old catalyst for efficiency. The effective process period is about ten hours before regeneration or a charge of catalyst becomes necessary. The process may be carried out in the liquid or vapor phase, although the vapor phase is preferred for higher yields. The conversion of the phenolic compounds to the substituted phenolic compounds is preferably effected by conveying the starting materials, preferably in the vapor phase and at a suitable space velocity (e. g. space velocities ranging from about 10 to about 100, and preferably from about 20 to 60), over the catalyst. The term "space velocity" as employed herein may be defined as the number of mols of the gaseous or vaporous starting organic material contacted with a liter of the catalyst per hour.

Any convenient temperature may be used in the execution of the process of the invention. It has been found that good yields may be obtained at temperatures at least high enough to bring the reactants into the vapor phase. Temperatures above about 500° C. are in most cases not particularly advantageous since they favor thermal decomposition of the reactants and/or products with the resultant formation of by-products of little value. Temperatures of from about 350° C. to about 500° C. have been found to produce satisfactory results. The optimum temperature used in any specific case will depend upon the specific reactants, the molecular proportions and upon the other reaction conditions such as pressure, space velocity, etc. For example, in the methylation of 3,5-xylenol with methyl amine in a mole ratio of about 1:3.3 at about 17 atmospheres pressure using a space velocity of about 53, the minimum operating temperature for substantial yields was found to be about 400° C., with the reaction going smoothly at about 425° C. to about 450° C. Under these conditions temperatures much above 450° C. cause excessive gas production and carbon deposition, perhaps due to decomposition of methyl amine. Temperatures as low as 300° C. at about 6 to 7 atmospheres pressure produce very low yields. However, when methyl amine and 3,5-xylenol in a mole ratio of about 4.6:1 at a space velocity of approximately 45 and at a pressure of about 17 atmospheres, temperatures as high as about 475° C. have been found to produce satisfactory yields.

The reaction of the amine with a phenolic compound according to the process of the invention may be carried out at an elevated, reduced or atmospheric pressure although superatmospheric pressures are preferred. In general, pressures of at least about 5 atmospheres are satisfactory, and in some cases pressures of at least about 20 atmospheres have proved efficient, particularly at temperatures in the range of from about 350° C. to about 500° C. Since it is preferred to carry out the reaction in the vapor phase, the pressure should preferably be below that pressure at which the liquid phase results at the temperature employed.

The amine and the phenolic compound may be reacted in any proportions. Either of the reactants may be in excess, although it is preferred that the amine be in molar excess over the phenolic compound, particularly when highly substituted compounds are desired in the product. The most desirable mole ratio of the amine and the phenolic compound in the reactant feed would depend upon the specific reactants in any case and upon the degree of substitution desired. If it is desired to produce a mono-substituted phenolic compound, a mole ratio of amine to phenolic compound of about 0.5:1 may be sufficient. In general, a mole ratio of amine to phenolic compound of about 1:1 to about 7:1 produces satisfactory results, although greater or lesser ratios may be used. For the production of the more highly substituted phenolic compounds such as the tri-, tetra- and penta-substituted, mole ratios of about 2:1 to about 7:1 have proved satisfactory. When a pentaalky phenol is desired, mole ratios of about 3:1 to about 5:1 will produce efficient results. The feed may be introduced at any suitable space velocity.

The substituted phenolic compounds prepared by the execution of the process of this invention have many valuable properties and may serve a variety of purposes. Most of the substituted phenols possess antiseptic properties and may be used in germicidal, fungicidal and disinfectant compositions. Many of the substituted phenolic compounds may also be used in resins, as dye intermediates, as gasoline inhibitors, as intermediates in organic syntheses and for the preparation of photographic developers and oxidation inhibitors, etc. For example, 2,4,6-trimethyl phenol and pentamethyl phenol are excellent gasoline inhibitors; 2,3,5-trimethyl phenol is a valuable intermediate in the production of synthetic vitamins; 2,3,5,6-tetramethyl phenol may be subjected to nitration with subsequent reduction to give high yields of p-amino tetramethyl phenol which finds uses as a gasoline inhibitor, anti-knock additive, and as a reducing agent in photographic developers; etc.

The following examples are given to illustrate modes of executing the process of the invention.

Example I

Methyl amine and 3,5-xylenol in about a 5.6:1 mole ratio were passed over activated bauxite at a space velocity of about 45, at a temperature of about 475° C. and a pressure of about 17 atmospheres. The phenols recovered had the following approximate composition:

| | Per cent by weight |
|---|---|
| 3,5-xylenol | 5 |
| 2,3,5-trimethyl phenol | 45 |
| 2,3,5,6-tetramethyl and pentamethyl phenol | 50 |

These phenols can be separated by distillation.

Example II

Methyl amine and 3,5-xylenol in about a 3.3:1 mole ratio were reacted over activated bauxite at a space velocity of approximately 53, at a temperature of about 425° C. and a pressure of about 17 atmospheres to produce a mixture of methylated phenols.

Example III

Isopropyl amine and 3,5-xylenol in a mole ratio of about 3:1 were passed over activated bauxite at a space velocity of approximately 40, at a temperature of about 450° C. and a pressure of about 17 atmospheres to produce a mixture of isopropyl xylenols.

Example IV

Methyl amine and phenol in a 1:1 mole ratio are passed over activated alumina at a space velocity of approximately 20, at a temperature of about 425° C., and a pressure of about 20 atmospheres to produce an oil having the following approximate composition by weight:

| | Per cent |
|---|---|
| Anisol | 5 |
| Cresyl ethers | 6 |
| Phenol | 60 |
| o-Cresol | 20 |
| 2,6-dimethyl phenol | 5 |
| Higher boiling phenols | 4 |

By suitable modifications of the procedure noted in the above examples, many other substituted phenolic compounds may be prepared. For example, trimethyl-, tetramethyl- and pentamethyl phenols may be prepared by reacting a cresol or commercial cresylic acid with methyl amine; butyl phenols may be prepared by reacting phenol with butyl amine; phenyl-substituted phenols may be prepared by reacting phenol, a cresol or a xylenol with diphenyl amine; and so forth.

We claim as our invention:

1. A process for the alkylation of xylenol which comprises reacting 3,5-xylenol with a saturated aliphatic primary amine at a temperature of about 350° C. to about 500° C. and a pressure of at least about 5 atmospheres in the presence of an activated bauxite.

2. A process for the alkylation of a phenol which comprises reacting an alkylatable phenol with a saturated aliphatic primary amine at a temperature of about 350° C. to about 500° C. and at a pressure of at least about 5 atmospheres in the presence of a catalyst comprising an activated alumina.

3. A process for the alkylation of a phenol which comprises reacting in the vapor phase an alkylatable phenol with a saturated aliphatic primary amine at a superatmospheric pressure in the presence of a catalyst comprising an activated alumina.

4. A process for the production of isopropyl xylenol which comprises reacting 3,5-xylenol with isopropyl amine at a temperature of about 400° C. to about 475° C. and a pressure of about 10 to about 20 atmospheres in the presence of an activated bauxite.

5. A process for the production of a mixture containing substantial amounts of 2,3,5,6-tetramethyl phenol which comprises reacting 3,5-xylenol with methyl amine at a temperature of about 400° C. to about 475° C. and a pressure of about 10 to about 20 atmospheres in the presence of an activated bauxite.

6. A process for the production of a mixture containing substantial amounts of 2,3,5-trimethyl phenol which comprises reacting 3,5-xylenol with methyl amine at a temperature of about 400° C. to about 475° C. and a pressure of about 10 to about 20 atmospheres in the presence of an activated bauxite.

7. A process for the methylation of xylenol which comprises reacting in the vapor phase 3,5-xylenol with methyl amine at a superatmospheric pressure in the presence of a catalyst comprising an activated alumina.

8. A process for the methylation of xylenol which comprises reacting 3,5-xylenol with methyl amine in the presence of a catalyst comprising an activated alumina.

9. A process for the alkylation of xylenol which comprises reacting 3,5-xylenol with a saturated aliphatic primary amine in the presence of a catalyst comprising an activated alumina.

10. A process for the alkylation of a phenol which comprises reacting an alkylatable phenol with a saturated aliphatic primary amine in the presence of a catalyst comprising an activated alumina.

11. A process for the alkylation of a phenol compound which comprises reacting an alkylatable phenolic compound with a saturated aliphatic primary amine in the presence of a catalyst comprising aluminum oxide.

12. A process for the substitution of an aliphatic hydrocarbon radical for a hydrogen atom of the aromatic nucleus of a phenol which comprises reacting a phenol containing at least one replaceable hydrogen atom in the aromatic nucleus with an aliphatic primary amine at a temperature of about 350° C. to 500° C. and at a superatmospheric pressure in the presence of a metal oxide condensation catalyst.

13. A process for the alkylation of a phenol which comprises reacting an alkylatable phenol with a primary alkyl amine at a temperature of about 350° C. to about 500° C. in the presence of a condensation catalyst.

14. A process for the alkylation of a phenol which comprises reacting an alkylatable phenol with a primary alkyl amine at a superatmospheric pressure in the presence of a condensation catalyst.

15. A process for the substitution of an aliphatic hydrocarbon radical for a hydrogen atom of the aromatic nucleus of a phenolic compound which comprises reacting a phenolic compound containing at least one replaceable hydrogen atom in the aromatic nucleus with an aliphatic primary amine in the presence of a condensation catalyst.

DE LOSS E. WINKLER.
SEAVER A. BALLARD.

REFERENCES CITED

The following references are of record in the file of this patent:

UNITED STATES PATENTS

| Number | Name | Date |
| --- | --- | --- |
| 1,449,423 | Lowy | Mar. 27, 1923 |
| 1,980,901 | Bentley | Nov. 13, 1934 |
| 2,275,312 | Tinker | Mar. 3, 1942 |
| 2,291,804 | Gump | Aug. 4, 1942 |

FOREIGN PATENTS

| Number | Country | Date |
| --- | --- | --- |
| 168,689 | Great Britain | Sept. 12, 1921 |